United States Patent [19]
Rogers

[11] 3,777,829
[45] Dec. 11, 1973

[54] SNOWMOBILE WHEEL SUPPORT COMBINATION

[75] Inventor: Arthur L. Rogers, Livonia, Mich.

[73] Assignee: Johnson Stamping and Fine-Blanking Company, Farmington, Mich.

[22] Filed: Nov. 22, 1971

[21] Appl. No.: 201,031

[52] U.S. Cl. .................. 180/5 R, 280/8, 280/79.1
[51] Int. Cl. ............................................ B62m 27/02
[58] Field of Search ...................... 280/8, 79.1; D14/61 A; 180/5 R

[56] References Cited
UNITED STATES PATENTS

| D224,705 | 9/1972 | Mattson | D14/6 A |
|---|---|---|---|
| 1,947,154 | 2/1934 | Fox | 280/8 |
| 2,549,003 | 4/1951 | Pintak | 280/8 |

*Primary Examiner*—Robert R. Song
*Attorney*—Benjamin W. Colman

[57] ABSTRACT

A wheel support combination for a snowmobile is disclosed, wherein front end wheel and bracket units are manually attachable to and removable from the skis with minimum effort. A preferred method of attachment of the wheel and bracket units is also disclosed.

12 Claims, 15 Drawing Figures

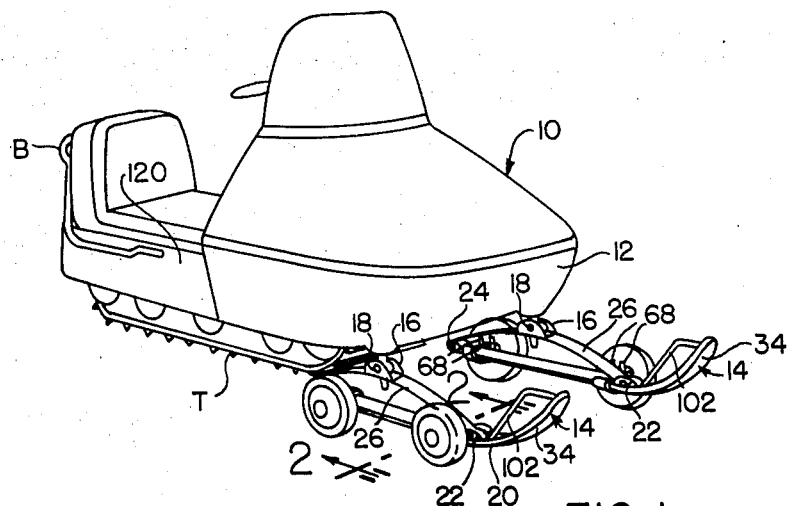

INVENTOR.
ARTHUR L. ROGERS

BY [signature]

ATTORNEY

SNOWMOBILE WHEEL SUPPORT COMBINATION

The invention involves a unitary wheel and bracket assembly which is manually and readily attachable to and removable from a snowmobile ski with ease, whereby the relatively heavy snowmobile, generally of about 400 to 425 pounds, can be readily moved and maneuvered into and out of a storage space with minimum manual effort and exertion.

A novel and preferred method of mounting the front end wheel-bracket device includes the steps of manually raising the front end of a ski, positioning the wheel-bracket device medially of the ski under a pivoting member, lowering the front end of the ski to ground plane upon the wheel-bracket device, thereby raising the rear end of the ski from the ground plane, manually mounting and securing a wheel-bracket device at the rearward end of the ski, and manually sliding the medially attached wheel-bracket device forwardly to a fore portion of the ski, so that the ski is fully and broadly supported upon a pair of the wheel-bracket devices. The second parallel ski is provided with a pair of wheel-bracket devices in the same manner.

Unless substantial equipment in the form of a lifting device, dollies, or hoist equipment, of some considerable expense and size, is available for use, a snowmobile cannot be easily maneuvered or stored in a garage or other home-associated structure. The driving of a snowmobile directly upon concrete, roadway, or other ground plane terrain where no snow is present, can result in damage to the skis and the endless drive track. Such damage in the storage of snowmobiles is not only undesirable, but should be assiduously avoided. In addition, the storage of a rubber or rubber composition track and metal skis upon concrete or other ground plane terrain during the warmer portions of the year can result in erosion of the steel skis and more rapid deterioration of the rubber track. Therefore, in addition to improved moving of the snowmobile by the wheel support combination hereindisclosed, the storage of the snomobile during the warmer months of the year provides the additional advantage of more careful maintenance.

As a construction equivalent to that of conventional shaft mounted wheels, swivel-type wheels in the form of casters or yoke-mounted wheels supported on bearings can be used. Such swivel-type wheels rotatably mounted on posts secured in bearings attached to or forming a part of the bracket member of the device at a vertically depending or horizontally extending flange will provide universal movement, i.e., in any direction. Such wheels, balls, or other rotatable member, swivels or turns in any direction depending upon the forces applied to the snowmobile when the wheel-bracket units are secured to the skis. Forward or lateral movement of the snowmobile is then made with relative ease.

Snowmobiles are designed to ride primarily upon snow, and to this end are provided with a pair of skis pivotally mounted adjacent the forward end of the snowmobile with an endless drive track disposed medially and rearwardly under the body of the snowmobile and aft of the skis. When the snowmobile is at rest upon the ground plane where no snow is present, as for instance upon a concrete roadway, garage floor, or other similar terrain, the snowmobile can be motor-driven from place to place. However, it is very difficult to move such a machine into a closely confined storage space without a considerable amount of manual and physical exertion and effort. Also, there are many locations in which a snowmobile can be stored, but only upon lateral movement, movement that cannot be effected by operation of the drive track. The provision of the wheel support combination hereindisclosed has enabled persons to readily and manually move a snowmobile into a storage position with a minimum amount of effort.

It is therefore an object of the invention to provide wheel support devices in a snowmobile supportive combination that are readily manually attachable to and removable from a snowmobile for ease in moving a snowmobile upon a ground plane terrain here no snow is present. Another object is to provide wheel and bracket devices having means for engaging a ski adjacent its lateral edges. Another object is to provide a swiveling wheel or caster attached to a bracket member, whereby lateral or substantially lateral movement to the snowmobile can be effected upon relatively hard ground plane terrain where no snow is present. Still another object is to provide wheel means for snowmobiles whereby the machine can be readily steered and moved upon a ground plane terrain where no snow is present. Yet a further object is to provide a unitary wheel and bracket device for attachment to snowmobile skis.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification in which FIG. 1 is a perspective view of a snowmobile having exemplary unitary wheel and bracket devices of this invention mounted upon the forward skis.

FIG. 2 is a front elevational view of the wheel and bracket device illustrated in and taken substantially on the line 2—2 of FIG. 1.

FIG. 3 is a perspective view of a slightly modified wheel and bracket device embodying the bracket member illustrated in FIGS. 1 and 2.

FIG. 4 is a similar perspective view of another slightly modified wheel and bracket device.

FIGS. 5 and 6 are fragmentary vertical sectional views taken substantially on the lines 5—5 and 6—6 of FIGS. 3 and 4 respectively.

Figure 7:
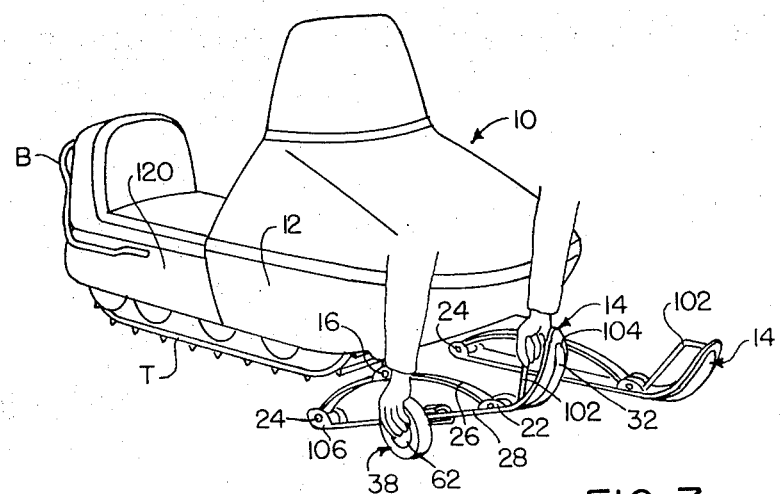
Figure 8:
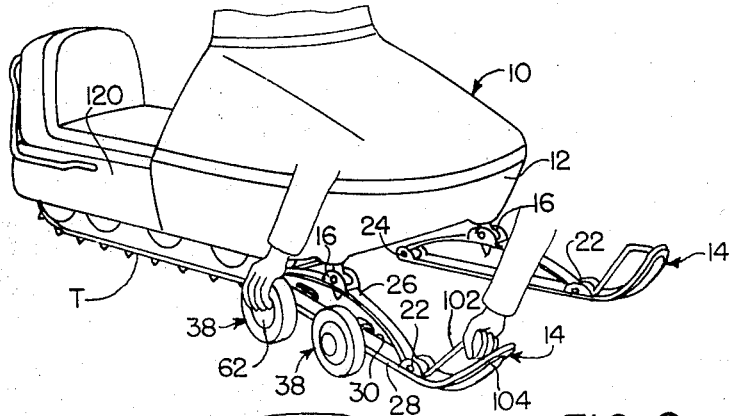
Figure 9:
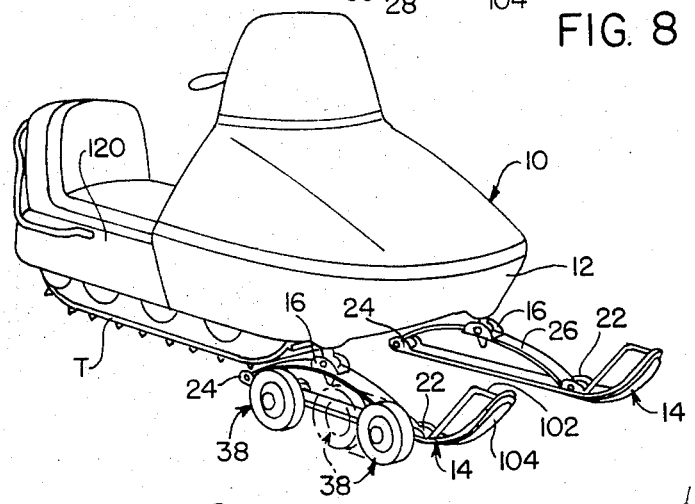

FIGS. 7, 8 and 9 are perspective views illustrating steps in the process of mounting the wheel and bracket devices of the style illustrated in FIGS. 1 and 2 upon a forward ski.

The snowmobile 10 generally comprises a lower chassis or frame portion 12 to the forward and lower portion of which are pivotally mounted the skis 14,14 by support members 16,16. Each ski 14 is vertically pivotable about the support member pin 18. The ski body 20 is supported at and by front and rear brackets 22, 24 respectively and connected to the member 16 by a flexible resilient spring member 26. The ski terminates laterally in outer and inner flanges 28, 30 respectively, and is provided with a longitudinal medial rib portion 32 extending from the distal end 24 substantially to its rearward end. A general or usual cross-sectional configuration of the ski body 20 is substantially as shown in FIG. 2, but such configuration will vary from manufacturer to manufacturer, depending upon the various engineering concepts for the ski of each particular manufacturer.

The wheel and bracket device 38 forming a part of the inventive combination may take several forms, three of which are hereindisclosed and illustrated. It is, however, to be distinctly understood that further modifications in respect to this device may be made in view of this disclosure. As illustrated particularly in FIG. 2, the wheel and bracket device 40 comprises a bracket member 42 terminating at its distal end in the inwardly turned hook portion 44 connected to the distal portion 46 and having a proximal portion 48 provided with a fastener opening 50 adapted to receive a fastener bolt 52. The bracket member portions 46 and 48 are bent at an intermediate portion 54 to form an obtuse angle in which the longitudinally extending medial ski rib portion 32 rests.

The bracket member 42 is secured to the member 56 which is provided with a laterally extending slot 58 through which fastener bolt 52 is passed for securing the members 42 and 56 together. The proximal end of the member 56 is bent over into a depending flange 60 to which the wheel 62 is rotatably mounted by and upon the shaft fastener 64. Extending upwardly from the body of member 56 at the bent portion 66 are a pair of upstanding lugs or ears 68,68 spaced apart from each other adjacent the lateral edges of the member 56 and bent into a posture whereby to removably engage the lateral outer edge 28 of the ski body 20.

In the modified forms of the wheel and bracket device 38A and 38B, illustrated in FIGS. 3-6 inclusive, the bracket 40 described hereinabove, is utilized without modification in the form illustrated in FIGS. 3 and 5, and with a slight modification in the form shown in FIGS. 4 and 6. The modification in ach instance involves primarily the substitution of rotatable wheel means considered the equivalent of the wheel 62, while providing the advantage of swivelling the wheel for rotation in a vertical plane in any direction.

In the modified form of the device 38A illustrated in FIGS. 3 and 5, a sleeve bearing 74 is secured by welding in vertical attitude to the outer surface of the depending flange 60, for supporting the caster 76 by its post or pin 78 rotatably disposed in the bearing 74. The caster wheel 80 swivels in any direction about the vertical axis of the pin 78.

In the form of the device 38B illustrated in FIGS. 4 and 6, the bracket member 42B of bracket 40B is substantially identical to the member 42 of bracket 40. The complementary bracket member 56B is substantially similar to the member 56 except that it is provided with a depending flange 60B that terminates at its distal end in the outboard flange 86. Upstanding lugs 68,68 are provided at the upper edge of the flange 60B as in the bracket member 56.

The swiveling caster wheel device 88 is secured by the bolt fastener 90, the washer 92, and the nut 94 to the outboard flange 86. The bearing caster 88 permits horizontal swiveling rotation of the wheel 96 about the fastener 90.

In any of the device forms 38, 38A or 38B, the bracket member 42 or 42B is adjustable longitudinally by backing of the screw 52 to allow for movement of the member 42 or 42B relative of the bracket member 56 or 56B, respectively, and tightening the screw to secure the two members in adjustable position, to suit the width of the ski body 20 to which the device is to be attached.

Although several methods for mounting the wheel and bracket device 38, 38A or 38B can be utilized, a preferred method, illustrated in FIGS. 7-9 inclusive and showing the wheel-bracket device 38, comprises the steps of manually grasping the front end of the ski 14 at any convenient place as for instance by the handle 102, lifting the forward end 104 so that the rearward end 106 is caused to pivot upon the ground plane, and elevating the forward end of the ski to a height such that the bracket 40 can be slipped under the ski body 20 until the hook end 44 is engaged upon the inner lateral curled edge 30 of the ski body and the medial rib portion 32 lies substantially in the region of the bend 54 of the bracket member 42. The wheel and bracket portion 56 is then lifted until the outer edge 28 of the ski body 20 is substantially at rest upon the bracket member portion 48 and closely adjacent and in the bend of the upstanding lugs 68,68 which engage and lie closely adjacent the ledge 28, substantially as illustrated in FIG. 2. The wheel and bracket device 38 is positioned substantially below the pivoting mounting member 16 as illustrated in FIG. 7. The forward end 104 of the ski 14 is then lowered upon the wheel and bracket device which now rests upon the ground plane terrain.

The next step in the mounting process is the manual pivoting of the ski 14 downwardly, upon the mounted device 38, at its front end 104 until the rearward end 106 is elevated substantially above the ground plane and sufficiently high to allow a second wheel and bracket device to be engaged adjacent the rearward end of the ski in the same manner as has been described immediately above for the medially positioned device. The forward end of the ski is then lowered until both of the wheel and bracket devices support the ski and the snowmobile portion immediately thereabove upon the ground plane terrain.

The last step in the mounting process is to lift the front end 104 of the ski and slide the medial wheel and bracket device 38 forwardly upon the ski body 20 until it is substantially adjacent and below the front ski mounting member 22, whereby the load at the wheel and bracket devices is substantially distributed upon the longitudinal ends of the ski normally at rest upon the ground plane terrain.

The process for mounting the wheel and bracket devices upon the second ski proceeds as above described. When the skis 14,14 and the snowmobile portion thereabove are supported upon at least the four wheel and bracket devices, of any of the forms illustrated in FIGS. 1-6 inclusive, the snowmobile can be readily driven by its track T and steered on the wheels 62. The snowmobile drive mechanism allows for forward and reverse movement and the snowmobile can be easily steered and maneuvered.

The wheel and bracket devices are preferably made of steel, the wheels 62 thereof being optionally provided with rubber tires. The caster and other swiveling devices can be provided with steel wheels that are optionally provided with rubber tires. Suitable fastening means where required include welding, threaded bolts and nuts, or other fastenings well known in the art for securing members of the several devices hereindisclosed in fixed or removable securement.

Although certain particular embodiments of the invention are hereindescribed for purposes of explanation, further modifications thereof, after study of this specification, will become apparent to those skilled in the art to which the invention pertains. Reference should be had to the appended claims in determining the scope of the invention.

I claim:

1. In a wheeled support structure to provide rolling movement upon a ground plane for a snowmobile having a pair of front-mounted skis, the sub-combination comprising
 a ski-supporting wheel structure having
   a bracket member having flange elements at each longitudinal end of said bracket member adapted to be removably engaged with both lateral side edges of each said ski in supportive relationship thereto, the flange element at the proximal end of said bracket member terminating in upstanding substantially vertical slightly inwardly offset lug means adapted to frictionally engage with and disengage from one said lateral side ski edges, the flange element at the distal end of said bracket member terminating in an inwardly turrned portion adapted to engage and overlie a portion of the other said lateral ski edges,
   and a wheel device mounted rotatably upon said bracket member adjacent said lug means for ground plane rolling engagement.

2. The structure defined in claim 1, wherein
said wheel device comprises
a wheel mounted rotatably upon a shaft secured to said bracket member.

3. The structure defined in claim 1, wherein
said wheel device comprises
   a swiveling caster mounted rotatably in a bearing secured to said bracket member.

4. The structure defined in claim 1, wherein
said wheel device comprises
   a horizontally swiveling rotatable wheel device mounted upon and secured to said bracket member.

5. The structure defined in claim 1, wherein
said bracket member comprises additionally a depending flange disposed at said proximal end of said bracket member, said wheel device being secured to said depending flange.

6. The structure defined in claim 1, wherein
said bracket member comprises
   a first bracket element and a second bracket element adjustably secured together for longitudinal adjustment,
   and a wheel device supporting flange secured to one of said bracket elements at the outer distal end thereof.

7. The structure defined in claim 6, wherein
said first bracket element comprises proximal
and distal longitudinally extending portions,
   said distal portion terminating in a first ski edge engaging hook end,
said second bracket element having a proximal portion engageable with said first bracket element proximal portion,
said flange being connected to said second bracket element distal end portion, said lug means extending from said second bracket element in a second ski edge engaging posture,
and fastening means adjustably securing said proximal portions together in longitudinal adjustment.

8. The structure defined in claim 6, wherein
said first bracket element comprises proximal and distal portions longitudinal disposed at an angle one to the other.

9. The structure defined in claim 6, wherein
said second bracket element is slotted for longitudinal adjustment of said element relative to said first bracket element,
and fastening means operative through said slot for securing said bracket elements in longitudinal adjustment.

10. The structure defined in claim 7, wherein
said flange is disposed at an angle to said second bracket element distal end portion,
said wheel device being secured for rotation to said flange.

11. The structure defined in claim 6, wherein
one of said bracket elements terminates at its distal end in an outwardly laterally extending flange portion, said wheel device being secured for rotation to said flange.

12. The structure defined in claim 11, wherein
said wheel device comprises a horizontally swiveling wheel rotatably mounted upon a horizontal shaft.

* * * * *